March 29, 1966   J. S. ECKERT   3,243,171
IN-BED REDISTRIBUTOR AND METHOD OF ASSEMBLY
Filed March 11, 1963   3 Sheets-Sheet 1

INVENTOR.
JOHN S. ECKERT
BY
*Gordon C. Leask*
ATTORNEY

March 29, 1966     J. S. ECKERT     3,243,171
IN-BED REDISTRIBUTOR AND METHOD OF ASSEMBLY
Filed March 11, 1963     3 Sheets-Sheet 2

INVENTOR.
JOHN S. ECKERT
BY
ATTORNEY

March 29, 1966 J. S. ECKERT 3,243,171
IN-BED REDISTRIBUTOR AND METHOD OF ASSEMBLY
Filed March 11, 1963 3 Sheets-Sheet 3

INVENTOR.
JOHN S. ECKERT
BY
*Gordon C. Mack*
ATTORNEY

United States Patent Office 3,243,171
Patented Mar. 29, 1966

3,243,171
IN-BED REDISTRIBUTOR AND METHOD
OF ASSEMBLY
John S. Eckert, Silver Lake, Ohio, assignor to The United States Stoneware Company, Tallmadge, Ohio, a corporation of Ohio
Filed Mar. 11, 1963, Ser. No. 264,335
13 Claims. (Cl. 261—97)

This invention relates to an in-bed redistributor, the combination of the redistributor in a gas-and-liquid contact tower, and the method of locating the redistributor in the tower.

In-bed redistributors are used to wipe liquid flowing down through a tower away from the wall and redistribute it into the interior of the tower away from the wall.

The redistributor of this invention features an expansion ring adjacent its periphery which is expanded into contact with the tower wall to position the redistributor against the wall and wipe away from the wall liquid that is flowing down it. The entire outer periphery of the ring may make sealing contact with the tower wall and divert all of the liquid flowing down the wall, or the periphery may be indented at intervals so that some of the liquid will continue flowing down the wall while the rest is redistributed into the interior of the packing bed.

The redistributor advantageously includes a member of expanded metal which extends inwardly from the expansion or wiper ring. By changing the free space within the confines of the expanded metal, the volume of gas passing through the tower is choked to a greater or less extent. The expanded metal is advantageously an annular member arranged conically, with the apex of the cone below the wiper ring. By varying the height of the cone, and also by predetermining the inside diameter of the expanded metal element, the amount of choking and consequently the pressure drop within the tower are controlled.

The invention is further described in connection with the accompanying drawings, in which—

Figure 2:
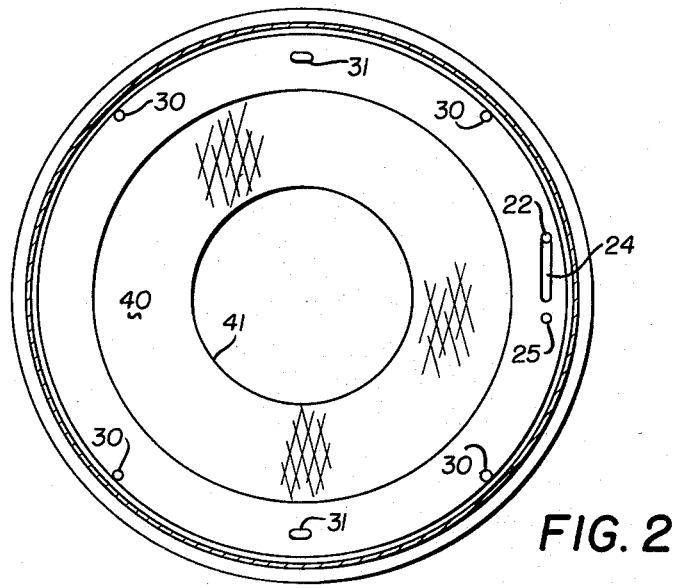
FIGURE 2 is a horizontal section on the line 2—2 of FIGURE 1.

Although in the drawings a steel tower 5 is shown, the composition and structure of the tower are immaterial. The invention is applicable to any tower with a cylindrical wall. The height is immaterial. There may be one or more redistributors located at different heights within the tower. The packing elements may be of any shape and composition. The redistributor is called an in-bed redistributor, because it rests directly on some of the packing elements and other packing elements are supported directly upon it. However, it may be installed between beds as a simple wall wiper.

In the tower 5 the gases enter at the inlet 6 and are exhausted through the outlet 7. The liquor enters at 8 and is removed at 9.

Figures 9, 10:
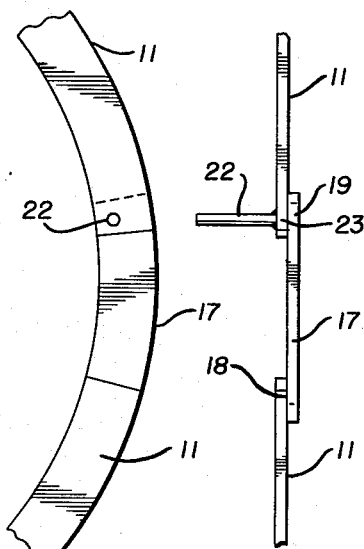
FIGURE 9 is a plan view of a portion of the wiper ring which includes the overlapped ends thereof.
FIGURE 10 is an elevation of the same.
Figure 11:
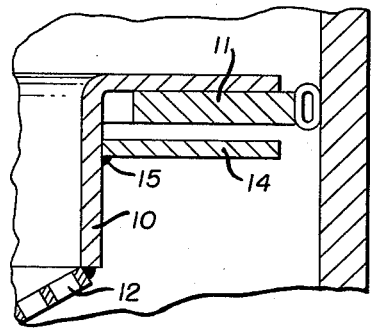
FIGURE 11 is a sectional elevation of the redistributor in the tower, showing a flattened tubular cushioning member between the wiper ring and the wall of the tower.
Figure 12:
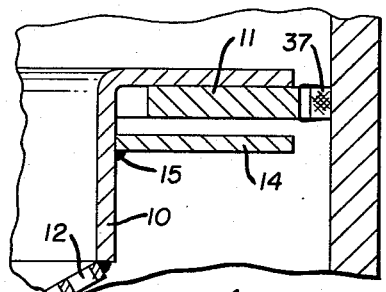
FIGURE 12 is a sectional elevation of the same, showing a rectangular cushion between the edge of the wiper ring and the wall of the tower.
Figure 13:
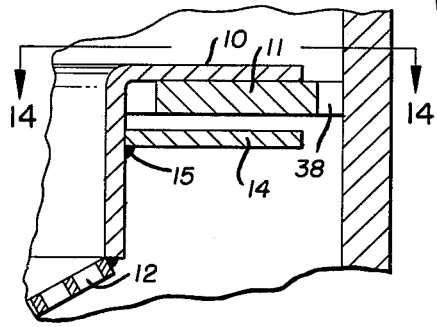
FIGURE 13 is an elevation of a redistributor in the tower, the outer edge of the expansion ring being indented at intervals.

Essentially the in-bed redistributor is formed (FIGURES 11, 12 and 13) from a frame 10, an expansion ring 11 which serves as a wiper or seal ring, and a conical expanded metal element 12. The frame 10 is formed of a rolled angle of stainless steel or any other suitable metal. A ring support 14 is welded at 15 (FIGURES 11–13) to the frame 10, leaving sufficient space between it and the horizontal portion of the angle to accommodate the wiper ring 11. As best shown in FIGURE 10, there is a connector bar 17 welded at one end to one end of the wiper ring by the weld 18. This spans the distance between the two ends of the ring. This bar 17 normally is just as wide as the wiper ring. Its free end 19 is overlapped by the end of the wiper ring opposite that to which the connector bar is fastened. Thus, the free end of the wiper ring slides on the connector bar as it is contracted and as it expands.

Figure 3:
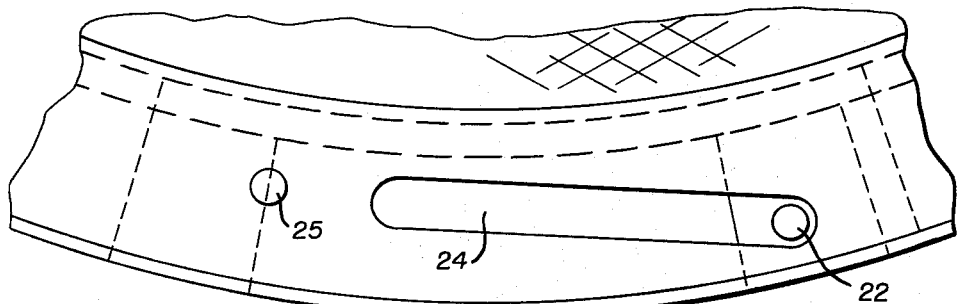
FIGURE 3 is an enlarged detail of the edge of a portion of the redistributor with the overlapping ends of the expansion ring in the expanded position.
Figure 4:
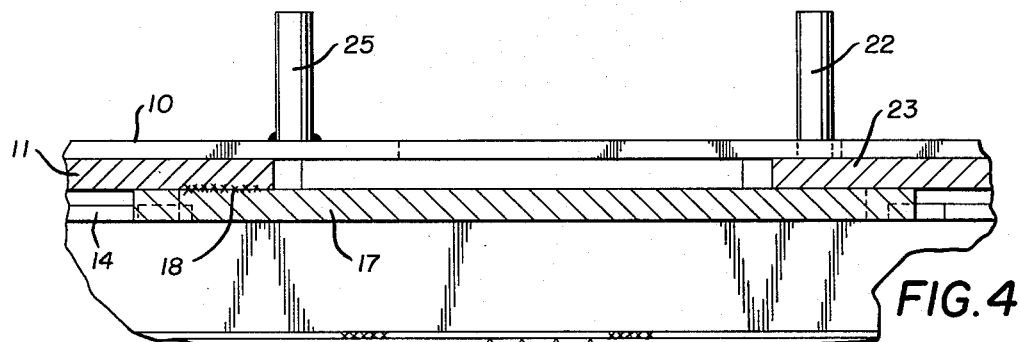
FIGURE 4 is an elevation of the portion of the redistributor shown in FIGURE 3.

The post 22 is fastened to the end 23 of the expansion ring and slides in the bias cut slot 24 (FIGURES 2, 3 and 5) in the frame 10. The post 25 is welded to the frame. The wiper ring is contracted by bringing the post 22 toward the post 25.

Figure 5:
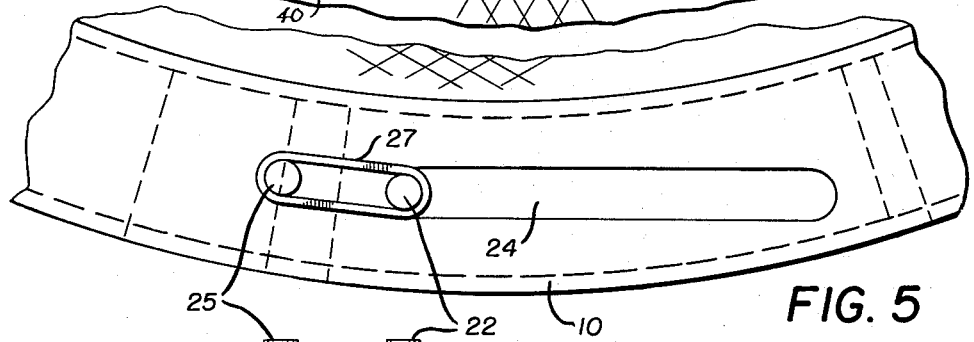
FIGURE 5 is a plan view of the same portion of the redistributor with the expansion ring contracted by disruptable means.
Figure 6:
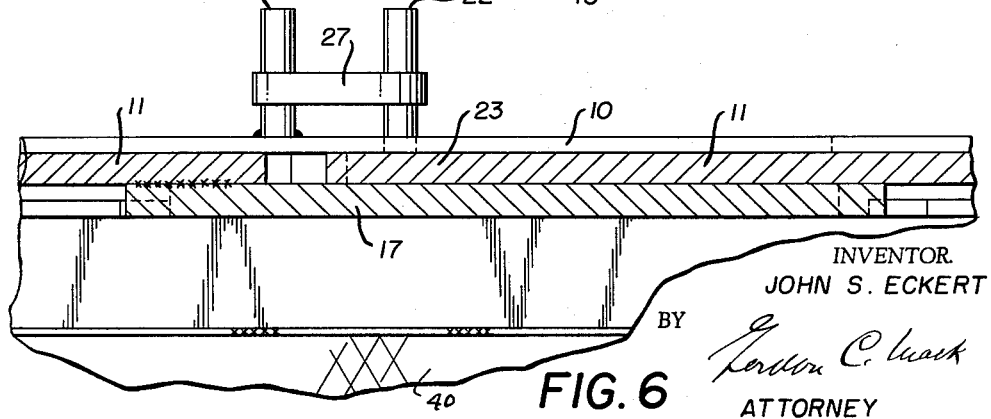
FIGURE 6 is an elevation of the portion of the redistributor shown in FIGURE 5.
Figures 7, 8:
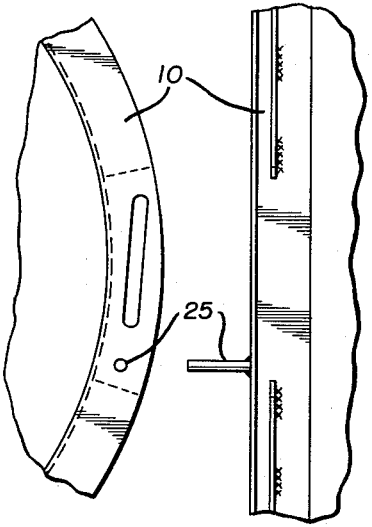
FIGURE 7 is a plan view of a portion of the frame which covers the expansion seal ring.
FIGURE 8 is an elevation of the exterior of the same.

FIGURES 5–6 show the posts 22 and 25 held together by a band 27 which maintains the wiper ring in a contracted state. The redistributor is placed in a tower with the posts banded together in this way, and after the redistributor is properly positioned, the band is disrupted. The band may be formed of twine which is cut with a knife before packing elements are placed on it, to permit the ring to expand. A preferred method is to use a band that is disrupted by the gas or liquid which is treated in the tower. For instance, in a tower designed for washing a gas with gasoline or benzene, the posts may be fastened together by a band of plastic that is soluble in the solvent. The redistributor is placed in a bed of packing elements with the wiper ring contracted, and packing elements are placed on top of the redistributor. Then, when the tower is put into use, the solvent disrupts the band, and the ring expands into contact with the wall of the tower thereby effecting a seal and forcing all or any predetermined amount of the liquid flowing down the tower wall to pass into the interior of the tower.

Figure 1:
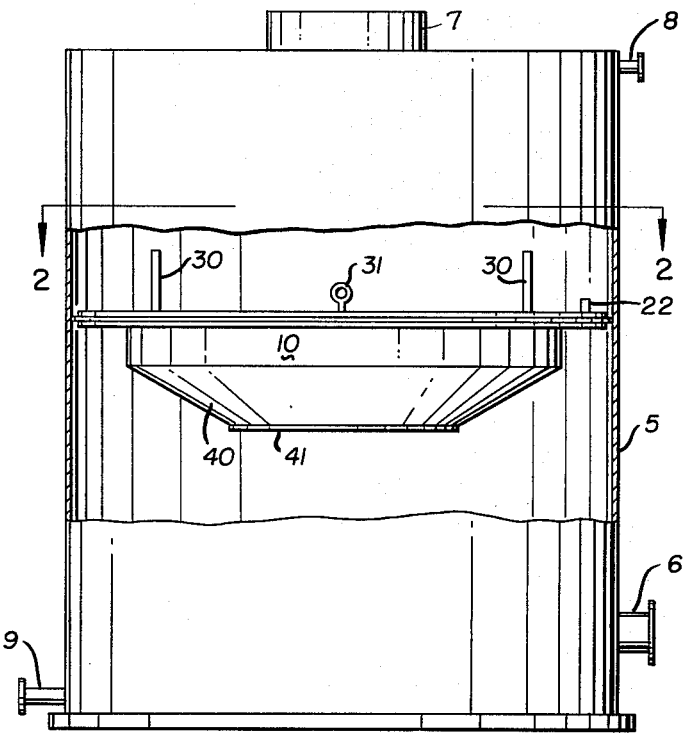
FIGURE 1 is an elevation of a tower, broken away at the middle, with an in-bed redistributor located within the tower, the packing being omitted to clarify the illustration.

Posts 30 (FIGURES 1 and 2), positioned at the outer periphery of the redistributor, at least three in number, contact the tower wall and prevent the redistributor from becoming cocked within the tower. Eyebolts 31 facilitate handling.

The outer periphery of the wiper ring is preferably cushioned to make sealing contact with the tower wall. The seal may be a hollow tube 35 of rubber or other elastomeric material (FIGURE 11) cemented to the edge of the ring 11, or it may be a strip 37 (FIGURE 12) of felt or other packing.

Figure 14:
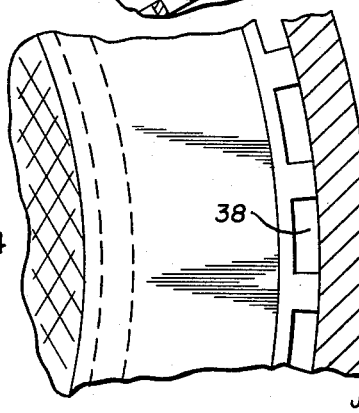
FIGURE 14 is a section on the line 14—14 of FIGURE 13.

It may be desirable to wipe only a part of the liquid from the wall. In this case the edge of the expansion or wiper ring 11 is serrated, as by indentations 38 (FIGURES 13 and 14) at its edge. Such a ring wipes only a part of the liquid from the tower wall, allowing the rest to flow down the wall. The edge of the ring may be cushioned between the serrations, although this is not necessary.

The dimensions of the frame 10 remain constant. The annular portion of the ring may be wider or narrower, depending upon whether more or less choking is desirable. The expanded metal cone 40 (FIGURES 1 and 2) is fastened to the bottom edge of the frame. This cone and wiper ring choke the flow of gas through the tower, as well as redistribute the liquid, and the extent that the gas is choked is controlled by the width of the expanded metal and the extent to which it is extended. Thus, by lowering the rim 41 of the expanded metal, more interference with the flow of the gas is provided than if it is raised.

Although the cone is attached to the frame of the redistributor and cooperates with the wiper ring to spread the liquid from the wall into the interior of the tower, the expanded metal cone may be used alone or attached to other means. However, it is advantageously incorporated as a part of the redistributor, and the extent to which it is extended and expanded controls to some extent the distance to which the liquid removed from the tower wall is carried into the packing bed. The expanded metal serves the dual function of both choking the tower and conducting the wiped liquid into the interior of the bed. It operates with varying degrees of severity by adjusting the amount of open space that is provided in it, as well as the angle of the cone and the degree of truncation of the cone.

The invention is covered in the claims which follow. What I claim is:

1. An in-bed redistributor for a gas-and-liquid treating tower, which redistributor includes a frame with a downwardly extending cylindrical center portion, and an annular cover and an under portion both extending outwardly from said center portion with a resilient expansion ring between the cover and under portion which extends radially outwardly therefrom, and operator means to contract said ring.

2. The redistributor of claim 1 in which there are a small number of at least three means extending vertically away from the outer periphery of the ring to provide leveling contact with the wall of the tower.

3. The redistributor of claim 1 provided with cushioning contact means at the outer periphery of the ring making contact with the wall of the tower clear around the tower.

4. The redistributor of claim 1 in which the outer periphery of the ring is indented at intervals to reduce the line of contact between the ring and the wall of the tower.

5. The redistributor of claim 1 with a conical expanded metal member attached to said center portion and extending inwardly and downwardly therefrom.

6. The redistributor of claim 1 in which an end portion of the ring is offset in overlapping relation with the other end of the ring, and the offset engages an engageable portion of the under portion whereby the expansion ring can be contracted by movement of said other end over the offset.

7. The redistributor of claim 6 in which one means projects from said other end of the ring through the cover and other means projects from the cover adjacent the offset whereby the ring can be contracted by bringing said projecting means toward one another.

8. The redistributor of claim 7 for use in a tower in which a chemical is to be treated, with said projecting means bonded together by a bond which is disruptable by contact of said chemical therewith.

9. In combination, a gas-and-liquid treating tower and mounted therein a resilient expansion ring sprung into pressure contact with the wall of the tower and connected to the ring a one-piece portion of expanded metal in the shape of a truncated cone pointing downwardly, which constricts the flow of gas through the tower.

10. The combination of claim 9 in which a horizontal solid frame portion extends outwardly from the expanded metal to the resilient expansion ring.

11. The method of assembling an in-bed redistributor in a gas-and-liquid treating tower, which redistributor includes a resilient expansion ring adjacent its periphery which is adapted to be expanded into contact with the wall of the tower, with disruptable means retaining the ends of the ring against expansion, which method comprises positioning the ring in the tower with said disruptable means intact, and thereafter disrupting the disruptable means.

12. The method of claim 11 in which the disruptable means is mechanically disrupted and packing elements are thereafter placed on the redistributor.

13. The method of claim 11 in a tower in which a chemical is to be used in the treatment, the disruptable means being disruptable by contact of the chemical therewith, which method includes disrupting the disruptable means after location in the tower by contact of the chemical therewith in the tower.

References Cited by the Examiner

UNITED STATES PATENTS

| 1,815,418 | 7/1931 | O'Bryan | 277—9 |
| 2,596,104 | 5/1952 | Schneible | 261—113 X |
| 2,607,662 | 8/1952 | Huff | 261—114 X |
| 2,639,130 | 5/1953 | Heere | 261—97 |
| 2,711,307 | 6/1955 | Milmore | 261—113 X |
| 2,839,280 | 6/1958 | McVey et al. | 261—113 |
| 2,939,771 | 6/1960 | McDonald et al. | 261—113 X |
| 3,045,830 | 7/1962 | Fulton | 210—450 X |
| 3,099,697 | 7/1963 | Lerman et al. | 261—97 |
| 3,170,873 | 2/1965 | May | 210—315 X |

OTHER REFERENCES

German Application No. 1,086,216, pub. Aug. 4, 1960.

HARRY B. THORNTON, *Primary Examiner.*

ROBERT F. BURNETT, *Examiner.*

T. R. MILES, *Assistant Examiner.*